(12) United States Patent
Kim et al.

(10) Patent No.: US 10,274,053 B2
(45) Date of Patent: Apr. 30, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 37 days.

(21) Appl. No.: 15/711,362

(22) Filed: Sep. 21, 2017

(65) Prior Publication Data

US 2018/0328458 A1 Nov. 15, 2018

(30) Foreign Application Priority Data

May 10, 2017 (KR) .......... 10-2017-0058302

(51) Int. Cl.
*F16H 3/62* (2006.01)
*F16H 57/00* (2012.01)
*F16H 57/02* (2012.01)

(52) U.S. Cl.
CPC .......... *F16H 3/62* (2013.01); *F16H 57/0018* (2013.01); *F16H 2057/02047* (2013.01); *F16H 2057/02095* (2013.01); *F16H 2200/0069* (2013.01); *F16H 2200/2015* (2013.01); *F16H 2200/2046* (2013.01)

(58) Field of Classification Search
CPC ............... F16H 3/62; F16H 57/0018; F16H 2057/02047; F16H 2057/02095; F16H 2200/0069; F16H 2200/2015; F16H 2200/2046

See application file for complete search history.

(56) References Cited

U.S. PATENT DOCUMENTS 5,887,670 A * 3/1999 Tabata ............... B60K 6/365
180/65.25
5,924,951 A * 7/1999 Winzeler ............... F16H 3/66
475/275

(Continued)

*Primary Examiner* — Patrick H Mackey
(74) *Attorney, Agent, or Firm* — Brinks Gilson & Lione

(57) ABSTRACT

A planetary gear train of an automatic transmission for vehicles is disclosed to improve power delivery performance and fuel efficiency by apply six engaging elements to reduce a drag loss of a clutch and a brake while achieving ten forward speed stages and one reverse speed stage. The planetary gear train includes: first, second, third, fourth, and fifth planetary gear sets disposed on the same axis; an input shaft; an output shaft; nine shafts connecting each rotational element of the first, second, third, fourth, and fifth planetary gear sets; three clutches and three brakes as the six engaging elements; and a transmission housing. Some of the nine shafts fixedly connect rotation elements selected from the rotation elements of the five planetary gear sets to each other while some of the nine shafts selectively connect a rotation element with the transmission housing via the brakes.

20 Claims, 4 Drawing Sheets

(56) References Cited

U.S. PATENT DOCUMENTS

| | | | |
|---|---|---|---|
| 8,663,056 B2* | 3/2014 | Gumpoltsberger | F16H 3/66 475/276 |
| 9,163,705 B1* | 10/2015 | Hwang | F16H 3/666 |
| 9,394,975 B1* | 7/2016 | Calvert | B60K 6/365 |
| 9,528,583 B2* | 12/2016 | Lubke | B60K 6/48 |
| 9,546,714 B2* | 1/2017 | Kook | F16H 3/66 |
| 9,933,048 B1* | 4/2018 | Kim | F16H 3/66 |
| 9,958,037 B1* | 5/2018 | Kim | F16H 3/66 |
| 9,958,038 B1* | 5/2018 | Kim | F16H 3/66 |
| 9,958,039 B1* | 5/2018 | Kim | F16H 3/66 |
| 2005/0137050 A1* | 6/2005 | Winzeler | F16H 3/66 475/296 |
| 2014/0004991 A1* | 1/2014 | Koch | F16H 3/66 475/276 |
| 2014/0038765 A1* | 2/2014 | Koch | F16H 3/66 475/276 |
| 2014/0038766 A1* | 2/2014 | Koch | F16H 3/66 475/276 |
| 2016/0109006 A1* | 4/2016 | Schoolcraft | F16H 15/52 475/185 |
| 2016/0169349 A1* | 6/2016 | Park | F16H 3/666 475/275 |
| 2016/0169350 A1* | 6/2016 | Park | F16H 3/666 475/275 |
| 2016/0169351 A1* | 6/2016 | Lee | F16H 3/666 475/275 |
| 2016/0169352 A1* | 6/2016 | Lee | F16H 3/666 475/275 |
| 2018/0328456 A1* | 11/2018 | Kim | F16H 3/62 |
| 2018/0328457 A1* | 11/2018 | Kim | F16H 3/62 |
| 2018/0328458 A1* | 11/2018 | Kim | F16H 3/62 |
| 2018/0328459 A1* | 11/2018 | Kim | F16H 3/62 |
| 2018/0328460 A1* | 11/2018 | Kim | F16H 3/66 |
| 2018/0328469 A1* | 11/2018 | Kim | F16H 3/663 |

\* cited by examiner

FIG. 2

| Shift stage | Engaging element ||||||  | Gear ratio | Ratio between shift stages | |
|---|---|---|---|---|---|---|---|---|---|
| | C1 | C2 | C3 | B1 | B2 | B3 | | | |
| D1 | | ● | ● | ● | | | 5.604 | | Gear ratio span : 8.15 |
| D2 | ● | | ● | ● | ● | | 3.853 | 1.454 | R/D1 ratio : 0.85 |
| D3 | ● | | ● | ● | | ● | 2.846 | 1.354 | |
| D4 | ● | | ● | ● | | | 2.151 | 1.323 | |
| D5 | ● | | | ● | | ● | 1.718 | 1.252 | |
| D6 | ● | ● | | | | ● | 1.386 | 1.240 | |
| D7 | ● | ● | | | | ● | 1.146 | 1.209 | |
| D8 | ● | ● | ● | | | | 1 | 1.146 | |
| D9 | ● | | | | ● | | 0.828 | 1.208 | |
| D10 | ● | | ● | | ● | | 0.688 | 1.203 | |
| REV1 | | | ● | | ● | ● | -4.712 | - | |

FIG. 4

| Shift stage | Engaging element | | | | | | Gear ratio | Ratio between shift stages | |
|---|---|---|---|---|---|---|---|---|---|
| | C1 | C2 | C3 | B1 | B2 | B3 | | | |
| D1 | | ● | ● | | | | 5.388 | | Gear ratio span : 8.847 |
| D2 | | | ● | ● | | | 3.591 | 1.500 | R/D1 ratio : 0.995 |
| D3 | ● | | ● | ● | | | 2.396 | 1.499 | |
| D4 | ● | | ● | ● | | | 1.816 | 1.319 | |
| D5 | ● | | ● | | | ● | 1.307 | 1.389 | |
| D6 | ● | ● | ● | | | | 1 | 1.307 | |
| D7 | ● | ● | | | | ● | 0.872 | 1.147 | |
| D8 | ● | ● | | | ● | | 0.757 | 1.152 | |
| D9 | | | ● | | ● | ● | 0.715 | 1.059 | |
| D10 | | | ● | | ● | ● | 0.609 | 1.174 | |
| REV1 | | | | | ● | ● | -5.361 | - | |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0058302, filed on May 10, 2017, which is incorporated herein by reference in its entirety.

FIELD

The present disclosure relates to an automatic transmission for vehicles.

BACKGROUND

The statements in this section merely provide background information related to the present disclosure and may not constitute prior art.

Research on realizing more shift-stages of an automatic transmission are undertaken to achieve enhancement of fuel consumption and better drivability.

In the field of the automatic transmission, a structure of the multistage transmission having the excellent linearity of the interstage ratio relates to a drivability such as an acceleration before and after the gear shift as well as a rhythm feeling of the engine speed.

However, as the number of shift stages is increased, the number of parts of the automatic transmission is increased, and as a result mountability, cost, weight, delivery efficiency, and the like may be rather aggravated.

As an effort to increase the fuel efficiency by multi-staging with reduced number of parts, an eight-speed automatic transmission has been introduced recently and a planetary gear train for an automatic transmission enabling more shift-stages has been investigated.

However, in the case of the recent eight-speed automatic transmission, we have discovered that because a span of a gear shift ratio (a factor for providing the linearity of the ratios between gear shift stages) is maintained at a level of 6.5 to 7.5, a power performance and a fuel consumption with a downsized engine is below a desired level of efficiency.

Also, in the eight-speed automatic transmission, since it is disadvantage to provide the linearity of the ratios between gear shift stages when the span of the gear shift ratio rises a level above 9.0, the operation efficiency of the engine and the drivability of the vehicle are negatively affected such that the development of automatic transmission of at least nine-speed or more is desired for its efficiency.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a planetary gear train of an automatic transmission for a vehicle that improves power delivery performance and fuel efficiency by applying six engaging elements instead of five planetary gear set for reducing a drag loss of a clutch and a brake while achieving ten forward speed stages and one reverse speed stage.

Also, the present disclosure provides a planetary gear train of an automatic transmission for a vehicle increasing a torque delivery efficiency and a durability by reducing a torque sharing of each planetary gear set and each engaging element through an application of a torque in parallel method to a planetary gear set of an output side.

In addition, the present disclosure is to provide a high efficiency planetary gear train of an automatic transmission for a vehicle with an excellent linearity of a ratio between gear shift stages for increasing a flexibility of an output gear ratio by applying five planetary gear sets to realize a shift-stage of the ten forward speed stages and one reverse speed stage.

In one form of the present disclosure, a planetary gear train of an automatic transmission for a vehicle includes: an input shaft configured to receive torque from an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft connected to the second rotational element and the input shaft; a second shaft connected to the fourteenth rotational element and the output shaft; a third shaft connected to the sixth rotational element and the thirteenth rotational element; a fourth shaft connected to the fifth rotational element, the ninth rotational element, and the fifteenth rotational element; a fifth shaft connected to the first rotational element; a sixth shaft connected to the third rotational element and the fourth rotational element; a seventh shaft connected to the eighth rotational element and the eleventh rotational element; an eighth shaft connected to the tenth rotational element; and a ninth shaft connected to the seventh rotational element and the twelfth rotational element.

The planetary gear train may include six engaging elements configured to selectively connect any two shafts selected from the nine shafts to each other, or a corresponding shaft to a transmission housing, and configured to realize forward or reverse speed stages by controlling three engaging elements among the six engaging elements.

The six engaging elements may include: three clutches configured to interconnect the selected two shafts among the nine shafts, and three brakes configured to selectively connect the corresponding shaft to the transmission housing. In particular, the corresponding shaft is not connected to the input shaft or the output shaft.

The six engaging elements may include: a first clutch disposed between the first shaft and the seventh shaft; a second clutch disposed between the third shaft and the seventh shaft; a third clutch disposed between the fifth shaft and the eighth shaft; a first brake disposed between the third shaft and the transmission housing; a second brake disposed between the ninth shaft and the transmission housing; and a third brake disposed between the eighth shaft and the transmission housing.

The six engaging elements may include: a first clutch disposed between the first shaft and the seventh shaft; a second clutch disposed between the third shaft and the seventh shaft; a third clutch disposed between the fifth shaft and the eighth shaft; a first brake disposed between the third shaft and the transmission housing; a second brake disposed between the ninth shaft and the transmission housing; and a third brake disposed between the fifth shaft and the transmission housing.

The first, second, and third rotational elements of the first planetary gear set may be a first sun gear, a first planet carrier, and a first ring gear, respectively, the fourth, fifth, and sixth rotational elements of the second planetary gear set may be a second sun gear, a second planet carrier, and a second ring gear, respectively, and the seventh, eighth, and ninth rotational elements of the third planetary gear set may be a third sun gear, a third planet carrier, and a third ring gear, respectively. The tenth, eleventh, and twelfth rotational elements of the fourth planetary gear set may be a fourth sun gear, a fourth planet carrier, and a fourth ring gear, respectively, and the thirteenth, fourteenth, and fifteenth rotational elements of the firth planetary gear set may be a fifth sun gear, a fifth planet carrier, and a fifth ring gear, respectively.

The first, second, third, fourth, and fifth planetary gear sets may be disposed in a sequence of the fourth, first, second, fifth, and third planetary gear sets.

An exemplary form of the present disclosure may realize forward tenth speed shift-stages and one reverse speed shift-stage by combining five planetary gear sets made of the simple planetary gear set with six engaging elements.

In addition, since gear shift ratio span greater than 8.1 is secured, driving efficiency of the engine may be improved. In addition, since linearity of the ratios between gear shift stages can be secured due to multiple speed stages, drivability such as acceleration before and after shift, rhythmical engine speed, and so on may be improved.

Since ten forward speed stages and one reverse speed stages are achieved with reduced engaging elements, torque delivery efficiency and fuel economy may be improved by reducing a drag loss of the clutches and the brakes.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for each shift-stage of an engaging element applied to a planetary gear train in a first exemplary form of the present disclosure;

FIG. 4 is an operational chart for each shift-stage of an engaging element applied to a planetary gear train in a second exemplary form of the present disclosure.

Figure 1:
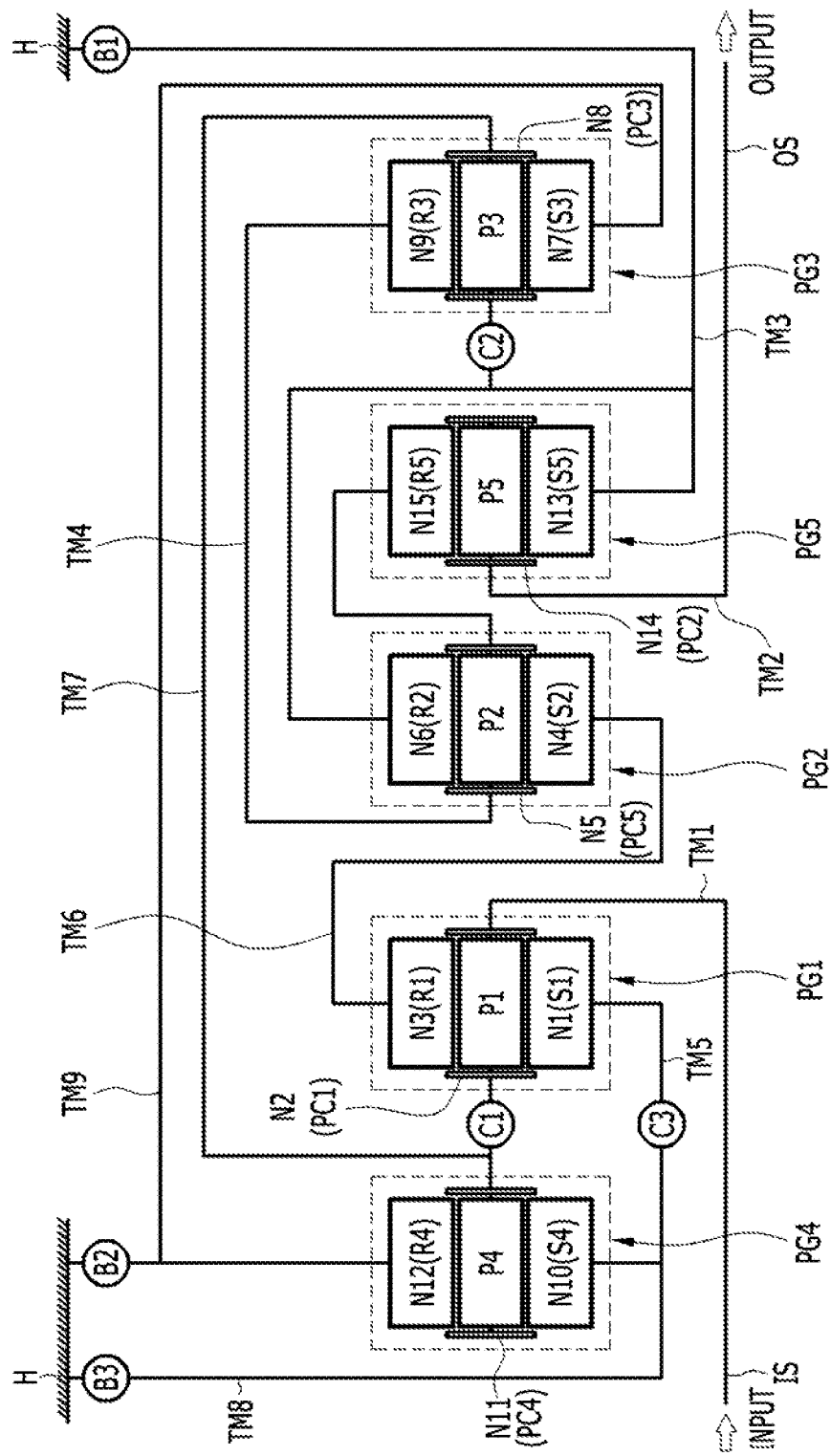
FIG. 1 is a schematic diagram of a planetary gear train in a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, contents that are not associated with a description will be omitted in order to clearly describe an exemplary form of the present disclosure, and components that are the same as or are similar to each other will be denoted by the same reference numerals throughout the present disclosure.

In the following description, the same components are classified into first, second, and the like to differentiate names for components and a sequence thereof is not necessarily limited thereto.

Further, as used herein, description of elements being "fixedly" connected or interconnected includes elements that are directly connected, i.e. one element directly connected to another element for rotation therewith.

FIG. 1 is a schematic diagram of a planetary gear train according to a first exemplary form of the present disclosure.

Referring to FIG. 1, a planetary gear train includes: first, second, third, fourth, and fifth planetary gear sets PG1, PG2, PG3, PG4, and PG5 disposed on the same axis; an input shaft IS; an output shaft OS; nine shafts TM1 to TM9 connecting each rotational element of the first, second, third, fourth, and fifth planetary gear sets PG1, PG2, PG3, PG4, and PG5; three clutches C1 to C3 and three brakes B1 to B3 as an engaging element; and a transmission housing H.

As a result, torque input to the input shaft IS from the engine is transmitted by an inter-complementation operation of the first, second, third, and fifth planetary gear sets PG1, PG2, PG3, PG4, and PG5 to be output through the output shaft OS.

In the first exemplary form of the present disclosure, the planetary gear sets are arranged in the order of fourth, first, second, fifth, and third planetary gear sets PG4, PG1, PG2, PG5, and PG3, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus.

The first planetary gear set PG1 is a single pinion planetary gear set and includes a first sun gear S1 being a first rotational element N1, a first planet carrier PC1 being a second rotational element N2 and supporting a plurality of first pinion gears P1 radially engaged with an external circumference side of the first sun gear S1 with an equal interval to be rotated and revolved, and a first ring gear R1 being a third rotational element N3 engaged with the plurality of first pinion gears P1 and torque-connected to the first sun gear S1.

The second planetary gear set PG2 is a single pinion planetary gear set and includes a second sun gear S2 being a fourth rotational element N4, a second planet carrier PC2 being a fifth rotational element N5 and supporting a plurality of second pinion gears P2 radially engaged with an external circumference side of the second sun gear S2 with an equal interval to be rotated and revolved, and a second ring gear R2 being a sixth rotational element N6 engaged with the plurality of second pinion gears P2 and torque-connected to the second sun gear S2.

The third planetary gear set PG3 is a single pinion planetary gear set and includes a third sun gear S3 being a seventh rotational element N7, a third planet carrier PC3 being an eight rotational element N8 and supporting a plurality of third pinion gears P3 radially engaged with an external circumference side of the third sun gear S3 with an equal interval to be rotated and revolved, and a third ring gear R3 being a ninth rotational element N9 engaged with the plurality of third pinion gears P3 and torque-connected to the third sun gear S3.

The fourth planetary gear set PG4 is a single pinion planetary gear set and includes a fourth sun gear S4 being a tenth rotational element N10, a fourth planet carrier PC4 being a eleven rotational element N11 and supporting a plurality of fourth pinion gears P4 radially engaged with an external circumference side of the fourth sun gear S4 with an equal interval to be rotated and revolved, and a fourth ring gear R4 being a twelve rotational element N12 engaged with the plurality of fourth pinion gears P4 and torque-connected to the fourth sun gear S2.

The fifth planetary gear set PG5 is a single pinion planetary gear set and includes a fifth sun gear S5 being a thirteenth rotational element N13, a fifth planet carrier PC5 being a fourteenth rotational element N14 and supporting a plurality of fifth pinion gears P5 radially engaged with an external circumference side of the fifth sun gear S5 with an equal interval to be rotated and revolved, and a fifth ring gear R5 being a fifteenth rotational element N15 engaged with the plurality of fifth pinion gears P4 and torque-connected to the fifth sun gear S2.

Here, the third rotational element N3 is connected directly to the fourth rotational element N4, the fifth rotational element N5 is connected directly to the ninth rotational element N9 and the fifteenth rotational element N15, the sixth rotational element N6 is connected directly to the thirteenth rotational element N13, the seventh rotational element N7 is connected directly to the rotational element N12, and the eighth rotational element N8 is connected directly to the eleventh rotational element N11 such that the first, second, third, fourth, and fifth planetary gear sets PG1, PG2, PG3, PG4, and PG5 are operated while including total nine shafts TM1 to TM9.

The nine shafts TM1 to TM9 will be described in further detail.

Some of the nine shafts TM1 to TM9 directly connect a plurality of rotation elements among the rotation elements of the planetary gear sets PG1, PG2, PG3, PG4, and PG5 with each other. The nine shafts may be rotation members that are connected to any one rotation element of the rotation elements of the planetary gear sets PG1, PG2, PG3, PG4, and PG5, and rotate with the any one rotation element to transmit torque. The rotation members that selectively connect any one rotation element with the transmission housing H. are fixed members that directly connect any one rotation element to the transmission housing H.

The first shaft TM1 is connected to the second rotational element N2 {first planet carrier PC1} and is directly connected to the input shaft IS so as to be always operated as an input element.

The second shaft TM2 is connected to the fourteenth rotational element N14 {fifth planet carrier PC5} and is directly connected to the output shaft OS so as to be always operated as an output element.

The third shaft TM3 is connected to the sixth rotational element N6 {second ring gear R2} and the thirteenth rotational element N13 {fifth sun gear S5}.

The fourth shaft TM4 is connected to the fifth rotational element N5 {second planet carrier PC2}, the ninth rotational element N9 {third ring gear R3}, and the fifteenth rotational element N15 {fifth ring gear R5}.

The fifth shaft TM5 is connected to the first rotational element N1 {first sun gear S1}.

The sixth shaft TM6 is connected to the third rotational element N3 {first ring gear R1} and the fourth rotational element N4 {second sun gear S2}.

The seventh shaft TM7 is connected to the eighth rotational element N8 {third planet carrier PC3} and the eleventh rotational element N11 {fourth planet carrier PC4}.

The eighth shaft TM8 is connected to the tenth rotational element N10 {fourth sun gear S4}.

The ninth shaft TM9 is connected to the seventh rotational element N7 {third sun gear S3} and the twelfth rotational element N12 {fourth ring gear R4}.

Here, the fifth shaft TM5 is selectively connected to the eighth shaft TM8 to be torque-connected, and the first shaft TM1 and the third shaft TM3 are respectively connected to the seventh shaft TM7 while being selectively connected to be torque-connected.

Also, the third shaft TM3, the eighth shaft TM8, and the ninth shaft TM9 are selectively connected to the transmission housing H and are operated as a selectively fixed element.

Also, three clutches C1, C2, and C3 that are engaging elements are disposed at portions at which any two shafts among the nine shafts TM1 to TM9 including the input shaft IS and the output shaft OS are selectively connected with each other.

In addition, three brakes B1, B2, and B3 that are engaging elements are disposed at portions at which any one shaft among the nine shafts TM1 to TM9 is selectively connected with the transmission housing H.

Arrangement of the six engaging elements (three clutches C1 to C3 and three brakes B1 to B3) will be described in detail.

The first clutch C1 is disposed between the first shaft TM1 and the seventh shaft TM7 to selectively connect the first shaft TM1 and the seventh shaft TM7 for the power delivery.

The second clutch C2 is disposed between the third shaft TM3 and the seventh shaft TM7 to selectively connect the third shaft TM3 and the seventh shaft TM7 for the power delivery.

The third clutch C3 is disposed between the fifth shaft TM5 and the eighth shaft TM8 to selectively connect the fifth shaft TM5 and the eighth shaft TM8 for the power delivery.

The first brake B1 is disposed between the third shaft TM3 and the transmission housing H to selectively connect and fix the third shaft TM3 to the transmission housing H.

The second brake B2 is disposed between the ninth shaft TM9 and the transmission housing H to selectively connect and fix the ninth shaft TM9 to the transmission housing H.

The third brake B3 is disposed between the eighth shaft TM8 and the transmission housing H to selectively connect and fix the eighth shaft TM8 to the transmission housing H.

The engaging elements including the first, second, and third clutches C1, C2, and C3 and the first, second, and third brakes B1, B2, and B3 may be made of a multi-plate type hydraulic pressure friction engagement unit that is operated by hydraulic pressure supplied from a hydraulic pressure control apparatus, and the multi-plate type hydraulic pressure friction engagement unit of a wet type is mainly used, however it may be made of the engagement unit that may be operated depending an electrical signal supplied from an electric control apparatus such as a dog clutch, a differential clutch, an electronic clutch, etc.

FIG. 2 is an operational chart for each shift-stage of an engaging element applied to a planetary gear train according to the first exemplary form of the present disclosure.

Referring to FIG. 2, three engaging elements among the first, second, and third clutches C1, C2, and C3 and the first, second, and third brakes B1, B2, and B3 are operated at each shift stage in the planetary gear train.

In the forward first speed shift-stage D1, the second and third clutches C2 and C3, and the first brake B1 are simultaneously operated.

Accordingly, in the state that the third shaft TM3 is interconnected with the seventh shaft TM7 by the operation of the second clutch C2 and the fifth shaft TM5 is interconnected with the eighth shaft TM8 by the operation of the third clutch C3, the torque is input to the first shaft TM1.

Also, in the above input state, while the third shaft TM3 is operated as the fixed element by the operation of the first brake B1, the shifting is realized into the forward first speed stage such that the forward first speed stage is output to the output shaft OS connected to the second shaft TM2.

In the forward second speed shift-stage D2, the third clutch C3 and the first and second brake B1 and B2 are simultaneously operated.

Accordingly, in the state that the fifth shaft TM5 is interconnected with the eighth shaft TM8 by the operation of the third clutch C3, the torque is input to the first shaft TM1.

Also, in the above input state, while the third and ninth shaft TM3 and TM9 are operated as the fixed element by the operation of the first, second brakes B1 and B2, the shifting is realized into the forward second speed stage such that the forward second speed stage is output to the output shaft OS connected to the second shaft TM2.

In the forward third speed shift-stage D3, the third clutch C3 and the first and third brakes B1 and B3 are simultaneously operated.

Accordingly, in the state that the fifth shaft TM5 is interconnected with the eighth shaft TM8 by the operation of the third clutch C3, the torque is input to the first shaft TM1.

Accordingly, in the above input state, while the third and eighth shafts TM3 and TM8 are operated as the fixed element by the operation of the first and third brakes B1 and B3, the shifting is realized into the forward third speed stage such that the forward third speed stage is output to the output shaft OS connected to the second shaft TM2.

In the forward fourth speed shift-stage D4, the first and third clutches C1 and C3 and the first brake B1 are simultaneously operated.

Accordingly, in the state that the first shaft TM1 is interconnected with the seventh shaft TM7 by the operation of the first clutch C1 and the fifth shaft TM5 is interconnected with the eighth shaft TM8 by the operation of the third clutch C3, the torque is input to the first shaft TM1.

Also, in the above input state, while the third shaft TM3 is operated as the fixed element by the operation of the first brake B1, the shifting is realized into the forward fourth speed stage such that the forward fourth speed stage is output to the output shaft OS connected to the second shaft TM2.

In the forward fifth speed shift-stage D5, the first clutch C1 and the first and third brakes B1 and B3 are simultaneously operated.

Accordingly, in the state that the first shaft TM1 is interconnected with the seventh shaft TM7 by the operation of the first clutch C1, the torque is input to the first shaft TM1.

Also, in the above input state, while the third and eighth shafts TM3 and TM8 are operated as the fixed element by the operation of the first and third brakes B1 and B3, the shifting is realized into the forward fifth speed stage such that the forward fifth speed stage is output to the output shaft OS connected to the second shaft TM2.

In the forward sixth speed shift-stage D6, the first and third clutches C1 and C3 and the third brake B3 are simultaneously operated.

Accordingly, in the state that the first shaft TM1 is interconnected by the operation of the seventh shaft TM7 and the first clutch C1 and the fifth shaft TM5 is interconnected with the eighth shaft TM8 by the operation of the third clutch C3, the torque is input to the first shaft TM1.

Also, in the above input state, while the eighth shaft TM8 is operated as the fixed element by the operation of the third brake B3, the shifting is realized into the forward sixth speed stage such that the forward sixth speed stage is output to the output shaft OS connected to the second shaft TM2.

In the forward seventh speed shift-stage D7, the first and second clutches C1 and C2 and the third brake B3 are simultaneously operated.

Accordingly, in the state that the first shaft TM1 is interconnected with the seventh shaft TM7 by the operation of the first clutch C1 and the third shaft TM3 is interconnected with the seventh shaft TM7 by the operation of the second clutch C2, the torque is input to the first shaft TM1.

Also, in the above input state, while the eighth shaft TM8 is operated as the fixed element by the operation of the third brake B3, the shifting is realized into the forward seventh speed stage such that the forward seventh speed stage is output to the output shaft OS connected to the second shaft TM2.

In the forward eighth speed shift-stage D8, the first, second, and third clutches C1, C2, and C3 are simultaneously operated.

Accordingly, in the state that the first shaft TM1 is interconnected with the seventh shaft TM7 by the operation of the first clutch C1, the third shaft TM3 is interconnected with the seventh shaft TM7 by the operation of the second clutch C2, and the fifth shaft TM5 is interconnected with the eighth shaft TM8 by the operation of the third clutch C3, the torque is input to the first shaft TM1.

Thus, entire first, second, third, fourth, and fifth planetary gear sets PG1, PG2, PG3, PG4, and PG5 are integrally rotated, if the torque is input to the first shaft TM1, the torque is shift into the forward sixth speed stage of which the torque is output as input and the forward eight speed stage is output to the output shaft OS connected to the second shaft TM2.

In the forward ninth speed shift-stage D9, the first and second clutches C1 and C2 and the second brake B2 are simultaneously operated.

Accordingly, in the state that the first shaft TM1 is interconnected with the seventh shaft TM7 by the operation of the first clutch C1 and the third shaft TM3 is interconnected with the seventh shaft TM7 by the operation of the second clutch C2, the torque is input to the first shaft TM1.

Also, in the above input state, while the ninth shaft TM9 is operated as the fixed element by the operation of the second brake B2, the shifting is realized into the forward ninth speed stage such that the forward ninth speed stage is output to the output shaft OS connected to the second shaft TM2.

In the forward tenth speed shift-stage D10, the first and third clutches C1 and C3 and the second brake B2 are simultaneously operated.

Accordingly, in the state that the first shaft TM1 is interconnected with the seventh shaft TM7 by the operation of the first clutch C1 and the fifth shaft TM5 is interconnected with the eighth shaft TM8 by the operation of the third clutch C3, the torque is input to the first shaft TM1.

Also, in the above input state, while the ninth shaft TM9 is operated as the fixed element by the operation of the second brake B2, the shifting is realized into the forward tenth speed stage such that the forward tenth speed stage is output to the output shaft OS connected to the second shaft TM2.

In the reverse speed REV, the third clutch C3 and the second and third brakes B2 and B3 are simultaneously operated.

Accordingly, in the state that the fifth shaft TM5 is interconnected with the eighth shaft TM8 by the operation of the third clutch C3, the torque is input to the first shaft TM1.

Also, in the above input state, the ninth and eighth shafts TM9 and TM8 are operated as the fixed element by the operation of the second and third brakes B2 and B3, the shifting is realized in the reverse speed stage such that the reverse speed stage is output to the output shaft OS connected to the second shaft TM2.

Figure 3:
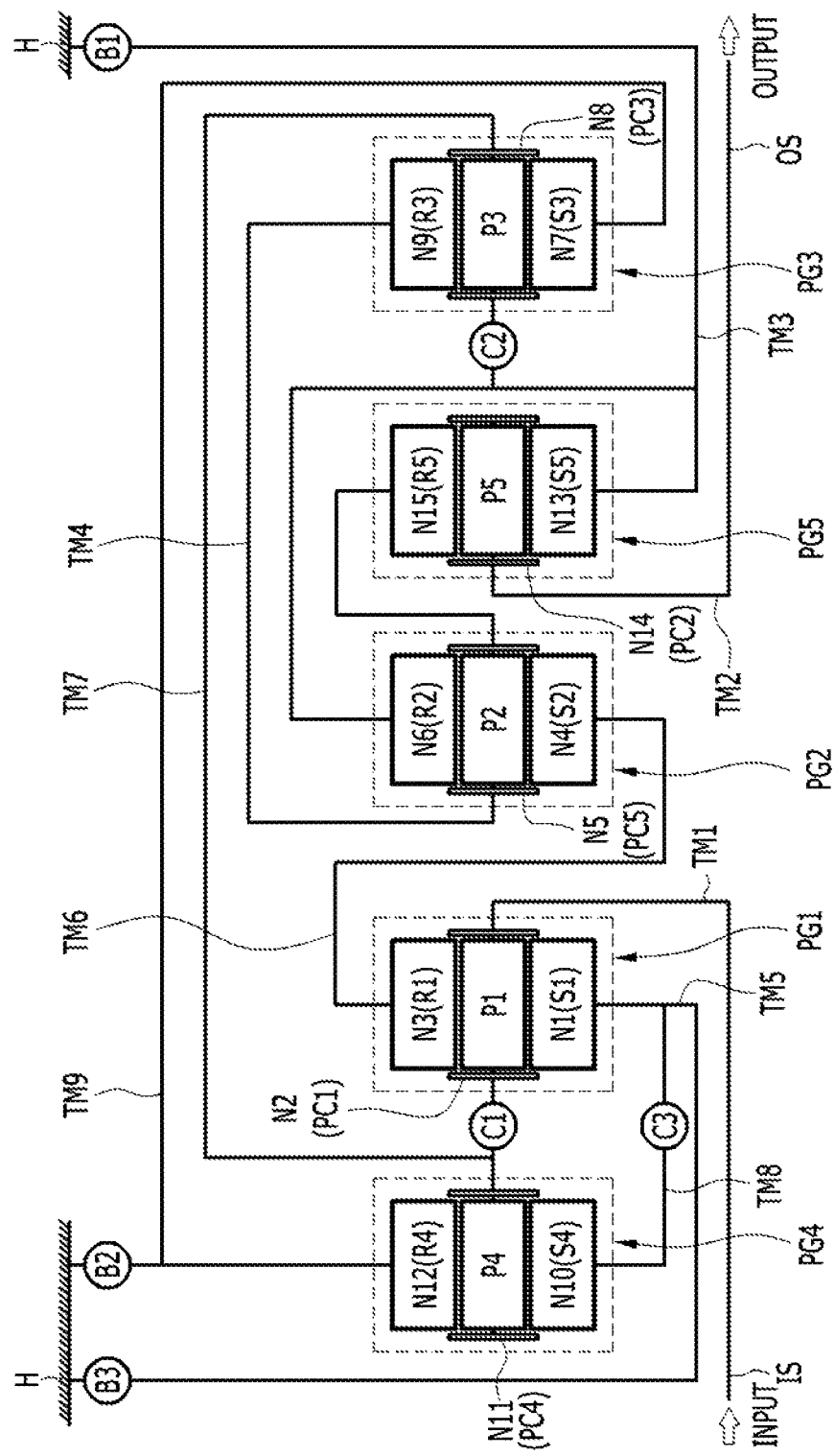
FIG. 3 is a schematic diagram of a planetary gear train in a second exemplary form of the present disclosure.

FIG. 3 is a schematic diagram of a planetary gear train according to a second exemplary form of the present disclosure.

Referring to FIG. 1 and FIG. 3, in the planetary gear train according to the first exemplary form of the present disclosure, the third brake B3 may be disposed between the eighth shaft TM8 and the transmission housing H to selectively connect the eighth shaft TM8 to the transmission housing H (in FIG. 1). In another form, the third brake B3 maybe disposed between the fifth shaft TM5 and the transmission housing H to selectively connect the fifth shaft TM5 to the transmission housing H (in FIG. 3) as a difference point in the planetary gear train according to the second exemplary form of the present disclosure.

The second exemplary form, compared with the planetary gear train according to the first exemplary form, has the same connection relation of nine shafts TM1 to TM9 as the main constituent elements and two clutches C2 and C3 and two brakes B1 and B2 as other engaging elements except for the different arrangement of the third brake B3.

FIG. 4 is an operational chart for each shift-stage of an engaging element applied to a planetary gear train according to a second exemplary form of the present disclosure.

Referring to FIG. 4, in the planetary gear train according to the second exemplary form of the present disclosure, the shifting from the forward tenth speed stage to one reverse speed stage is realized while three engaging elements among the first, second, and third clutches C1, C2, and C3 and the first, second, and third brakes B1, B2, and B3 are operated at each shift stage, and then the shifting process according to one example will be described as followings.

In the forward first speed shift-stage D1, the second and the third clutches C2 and C3, and the first brake B1 are simultaneously operated.

Accordingly, in the state that the third shaft TM3 is interconnected with the seventh shaft TM7 by the operation of the second clutch C2 and the fifth shaft TM5 is interconnected with the eighth shaft TM8 by the operation of the third clutch C3, the torque is input to the first shaft TM1.

Also, in the above input state, the third shaft TM3 is operated as the fixed element by the operation of the first brake B1, the shifting is realized in the forward first speed stage such that the forward first speed stage is output to the output shaft OS connected to the second shaft TM2.

In the forward second speed shift-stage D2, the third clutch C3 and the first and second brakes B1 and B2 are simultaneously operated.

Accordingly, in the state that the fifth shaft TM5 is interconnected with the eighth shaft TM8 by the operation of the third clutch C3, the torque is input to the first shaft TM1.

Also, in the above input state, the third and ninth shafts TM3 and TM9 are operated as the fixed element by the operation of the first and second brakes B1 and B2, the shifting is realized the forward second speed stage such that the forward second speed stage is output to the output shaft OS connected to the second shaft TM2.

In the forward third speed shift-stage D3, the third clutch C3 and the first and third brakes B1 and B3 are simultaneously operated.

Accordingly, in the state that the fifth shaft TM5 is interconnected with the eighth shaft TM8 by the operation of the third clutch C3, the torque is input to the first shaft TM1.

Also, in the above input state, while the third and fifth shafts TM3 and TM5 are operated as the fixed element by the operation of the first and third brakes B1 and B3, the shifting is realized in the forward third speed stage such that the forward third speed stage is output to the output shaft OS connected to the second shaft TM2.

The forward fourth speed shift-stage D4, the first and third clutches C1 and C3 and the first brake B1 are simultaneously operated.

Accordingly, in the state that the first shaft TM1 is interconnected with the seventh shaft TM7 by the operation of the first clutch C1, and the fifth shaft TM5 is interconnected with the eighth shaft TM8 by the operation of the third clutch C3, the torque is input to the first shaft TM1.

Also, in the above input state, while the third shaft TM3 is operated as the fixed element by the operation of the first brake B1, the shifting is realized in the forward fourth speed stage such that the fourth speed stage is output to the output shaft OS connected to the second shaft TM2.

In the forward fifth speed shift-stage D5, the first and third clutches C1 and C3 and the third brake B3 are simultaneously operated.

Accordingly, in the state that the first shaft TM1 is interconnected with the seventh shaft TM7 by the operation of the first clutch C1 and the fifth shaft TM5 is interconnected with the eighth shaft TM8 by the operation of the third clutch C3, the torque is input to the first shaft TM1.

Also, in the above input state, the fifth shaft TM5 is operated as the fixed element by the operation of the third brake B3, the shifting is realized in the forward fifth speed stage such that the forward fifth speed stage is output to the output shaft OS connected to the second shaft TM2.

In the forward sixth speed shift-stage D6, the first, second, and third clutches C1, C2, and C3 are simultaneously operated.

Accordingly, in the state that the first shaft TM1 is interconnected with the seventh shaft TM7 by the operation of the first clutch C1, the third shaft TM3 is interconnected with the seventh shaft TM7 by the operation of the second clutch C2, and the fifth shaft TM5 is interconnected with the eighth shaft TM8 by the operation of the third clutch C3, the torque is input to the first shaft TM1.

Thus, entire first, second, third, fourth, and fifth planetary gear sets PG1, PG2, PG3, PG4, and PG5 are integrally rotated, if the torque is input to the first shaft TM1, the torque is shift into the sixth forward speed stage of which the torque is output as input such that the sixth forward speed stage is output to the output shaft OS connected to the second shaft TM2.

In the forward seventh speed shift-stage D7, the first and second clutches C1 and C2 and the third brake B3 are simultaneously operated.

Accordingly, in the state that the first shaft TM1 is interconnected with the seventh shaft TM7 by the operation of the first clutch C1, and the third shaft TM3 is interconnected with the seventh shaft TM7 by the operation of the second clutch C2, the torque is input to the first shaft TM1.

Also, in the above input state, while the fifth shaft TM5 is operated as the fixed element by the operation of the third brake B3, the shifting is realized in the forward seventh speed stage such that the forward seventh speed stage is output to the output shaft OS connected to the second shaft TM2.

In the forward eighth speed shift-stage D8, the first and second clutches C1 and C2 and the second brake B2 are simultaneously operated.

Accordingly, in the state that the first shaft TM1 is interconnected with the seventh shaft TM7 by the operation of the first clutch C1, and the third shaft TM3 is interconnected with the seventh shaft TM7 by the operation of the second clutch C2, the torque is input to the first shaft TM1.

Also, in the above input state, the ninth shaft TM9 is operated as the fixed element by the operation of the second brake B2, the shifting is realized in the forward eighth speed stage such that the forward eighth speed stage is output to the output shaft OS connected to the second shaft TM2.

In the forward ninth speed shift-stage D9, the first clutch C1 and the second and third brakes B2 and B3 are simultaneously operated.

Accordingly, in the state that the first shaft TM1 is interconnected with the seventh shaft TM7 by the operation of the first clutch C1, the torque is input to the first shaft TM1.

Also, in the above input state, while the ninth and fifth shafts TM9 and TM5 are operated as the fixed element by the operation of the second and third brakes B2 and B3, the shifting is realized in the forward ninth speed stage such that the forward ninth speed stage is output to the output shaft OS connected to the second shaft TM2.

In the forward tenth speed shift-stage D10, the first and third clutches C1 and C3 and the second brake B2 are simultaneously operated.

Accordingly, in the state that the first shaft TM1 is interconnected with the seventh shaft TM7 by the operation of the first clutch C1 and the fifth shaft TM5 is interconnected with the eighth shaft TM8 by the operation of the third clutch C3, the torque is input to the first shaft TM1.

Also, in the above input state, the ninth shaft TM9 is operated as the fixed element by the operation of the second brake B2, the shifting is realized in the forward tenth speed stage such that the forward tenth speed stage is output to the output shaft OS connected to the second shaft TM2.

In the reverse speed REV, the third clutch C3 and the second and third brakes B2 and B3 are simultaneously operated.

Accordingly, in the state that the fifth shaft TM5 is interconnected with the eighth shaft TM8 by the operation of the third clutch C3, the torque is input to the first shaft TM1.

Also, in the above input state, while the ninth and fifth shafts TM9 and TM5 are operated as the fixed element by the operation of the second and third brakes B2 and B3, the shifting is realized in the reverse speed stage such that the reverse speed state is output to the output shaft OS connected to the second shaft TM2.

As described above, the planetary gear train according to the first and second exemplary forms of the present disclosure applies only six engaging elements including three clutches C1, C2, and C3 and three brakes B1, B2, and B3 instead of the five planetary gear sets PG1, PG2, PG3, PG4, and PG5, thereby realizing the shift-stage of the forward tenth speed stage and one reverse speed.

In addition, since the gear shift ratio span is secured to be greater than 8.1, driving efficiency of the engine may be increased. In addition, since linearity of the ratios between gear shift stages can be secured due to multiple speed stages, drivability such as acceleration before and after shift, rhythmical engine speed, and so on may be improved.

In addition, while ten forward speed stages and one reverse speed stages are achieved, as the application of the engaging elements causing a drag loss such as clutches and brakes is decreased, torque delivery efficiency and fuel economy may be improved depending on the drag loss reduction.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A planetary gear train of an automatic transmission for a vehicle, the planetary gear train comprising:
   an input shaft configured to receive a torque from an engine;
   an output shaft configured to output a torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a fifth planetary gear set including thirteenth, fourteenth, and fifteenth rotational elements;
   a first shaft connected to the second rotational element and the input shaft;
   a second shaft connected to the fourteenth rotational element and the output shaft;
   a third shaft connected to the sixth rotational element and the thirteenth rotational element;
   a fourth shaft connected to the fifth rotational element, the ninth rotational element, and the fifteenth rotational element;
   a fifth shaft connected to the first rotational element;
   a sixth shaft connected to the third rotational element and the fourth rotational element;
   a seventh shaft connected to the eighth rotational element and the eleventh rotational element;
   an eighth shaft connected to the tenth rotational element; and
   a ninth shaft connected to the seventh rotational element and the twelfth rotational element.

2. The planetary gear train of claim 1, wherein
   the planetary gear train includes six engaging elements configured to selectively connect any two shafts selected from the nine shafts to each other, or a corresponding shaft to a transmission housing, and configured to realize forward or reverse speed stages by controlling three engaging elements among the six engaging elements.

3. The planetary gear train of claim 2, wherein the six engaging elements includes:
three clutches configured to interconnect the selected two shafts among the nine shafts, and
three brakes configured to selectively connect the corresponding shaft to the transmission housing, wherein the corresponding shaft is not connected to the input shaft or the output shaft.

4. The planetary gear train of claim 2, wherein the six engaging elements includes:
a first clutch disposed between the first shaft and the seventh shaft;
a second clutch disposed between the third shaft and the seventh shaft;
a third clutch disposed between the fifth shaft and the eighth shaft;
a first brake disposed between the third shaft and the transmission housing;
a second brake disposed between the ninth shaft and the transmission housing; and
a third brake disposed between the eighth shaft and the transmission housing.

5. The planetary gear train of claim 2, wherein the six engaging elements includes:
a first clutch disposed between the first shaft and the seventh shaft;
a second clutch disposed between the third shaft and the seventh shaft;
a third clutch disposed between the fifth shaft and the eighth shaft;
a first brake disposed between the third shaft and the transmission housing;
a second brake disposed between the ninth shaft and the transmission housing; and
a third brake disposed between the fifth shaft and the transmission housing.

6. The planetary gear train of claim 1, wherein
the first, second, and third rotational elements of the first planetary gear set are respectively a first sun gear, a first planet carrier, and a first ring gear;
the fourth, fifth, and sixth rotational elements of the second planetary gear set are respectively a second sun gear, a second planet carrier, and a second ring gear;
the seventh, eighth, and ninth rotational elements of the third planetary gear set are respectively a third sun gear, a third planet carrier, and a third ring gear;
the tenth, eleventh, and twelfth rotational elements of the fourth planetary gear set are respectively a fourth sun gear, a fourth planet carrier, and a fourth ring gear; and
the thirteenth, fourteenth, and fifteenth rotational elements of the fifth planetary gear set are respectively a fifth sun gear, a fifth planet carrier, and a fifth ring gear.

7. The planetary gear train of claim 1, wherein
the first, second, third, fourth, and fifth planetary gear sets are disposed in a sequence of the fourth, first, second, fifth, and third planetary gear sets.

8. A planetary gear train of an automatic transmission for a vehicle, the planetary gear train comprising:
an input shaft configured to receive a torque from an engine;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a fifth planetary gear set including thirteenth, fourteenth, and fifteenth rotational elements;
a first shaft connected to the second rotational element and the input shaft;
a second shaft connected to the fourteenth rotational element and the output shaft;
a third shaft connected to the sixth rotational element and the thirteenth rotational element;
a fourth shaft connected to the fifth rotational element, the ninth rotational element, and the fifteenth rotational element;
a fifth shaft connected to the first rotational element;
a sixth shaft connected to the third rotational element and the fourth rotational element;
a seventh shaft connected to the eighth rotational element and the eleventh rotational element;
a plurality of shafts selectively connected to a transmission housing, wherein the plurality of shafts are respectively connected to a corresponding rotational element of the third and fourth planetary gear sets that is not connected to another rotational element selected from the rotational elements of the five planetary gear sets.

9. The planetary gear train of claim 8, wherein the plurality of shafts includes:
an eighth shaft connected to the tenth rotational element; and
a ninth shaft connected to the seventh rotational element and the twelfth rotational element.

10. The planetary gear train of claim 9, wherein the planetary gear train further includes:
three clutches configured to interconnect two shafts among the nine shafts; and
three brakes configured to selectively connect a transmission housing to any shaft selected from the nine shafts, wherein the selected shaft is not connected to the input shaft or the output shaft.

11. The planetary gear train of claim 10, wherein the three clutches include:
a first clutch disposed between the first shaft and the seventh shaft;
a second clutch disposed between the third shaft and the seventh shaft; and
a third clutch disposed between the fifth shaft and the eighth shaft, and the three brakes include:
a first brake disposed between the third shaft and the transmission housing;
a second brake disposed between the ninth shaft and the transmission housing; and
a third brake disposed between the eighth shaft and the transmission housing.

12. The planetary gear train of claim 10, wherein the three clutches include:
a first clutch disposed between the first shaft and the seventh shaft;
a second clutch disposed between the third shaft and the seventh shaft; and
a third clutch disposed between the fifth shaft and the eighth shaft, and the three brakes includes:
a first brake disposed between the third shaft and the transmission housing;

a second brake disposed between the ninth shaft and the transmission housing; and a third brake disposed between the fifth shaft and the transmission housing.

13. The planetary gear train of claim 8, wherein
the first, second, and third rotational element are respectively a first sun gear, a first planet carrier, and a first ring gear,
the fourth, fifth, sixth rotational elements are respectively a second sun gear, a second planet carrier, and a second ring gear,
the seventh, eighth, and ninth rotational element are respectively a third sun gear, a third planet carrier, and a third ring gear,
the tenth, eleventh, and twelfth rotational elements are respectively a fourth sun gear, a fourth planet carrier, and a fourth ring gear, and
the thirteenth, fourteenth, and fifteenth rotational elements are respectively a fifth sun gear, a fifth planet carrier, and a fifth ring gear.

14. The planetary gear train of claim 8, wherein:
the first, second, third, fourth, and fifth planetary gear sets are disposed in sequence of the fourth, first, second, fifth, and third planetary gear sets.

15. A planetary gear train of an automatic transmission for a vehicle, the planetary gear train comprising:
an input shaft configured to receive a torque from an engine;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a fifth planetary gear set including thirteenth, fourteenth, and fifteenth rotational elements;
a first shaft connected to the second rotational element and the input shaft;
a second shaft connected to the fourteenth rotational element and the output shaft;
a third shaft connected to the sixth rotational element and the thirteenth rotational element;
a fourth shaft connected to the fifth rotational element, the ninth rotational element, and the fifteenth rotational element;
a fifth shaft connected to the first rotational element;
a sixth shaft connected to the third rotational element and the fourth rotational element;
a seventh shaft connected to the eighth rotational element and the eleventh rotational element;
eighth and ninth shafts selectively connected to a transmission housing, wherein the eighth and ninth shafts are respectively connected to corresponding rotational elements of the third and fourth planetary gear sets that are not connected to another rotational element selected from the rotational elements of the five planetary gear sets.

16. The planetary gear train of claim 15, further comprising:
clutches configured to selectively connect the first shaft and the seventh shaft, the third shaft and the seventh shaft, and the fifth shaft and the eighth shaft through a corresponding clutch,
wherein the eighth shaft is connected to the tenth rotational element,
the ninth shaft is connected to the seventh rotational element and the twelfth rotational element.

17. The planetary gear train of claim 16, wherein
the clutch includes:
a first clutch disposed between the first shaft and the seventh shaft;
a second clutch disposed between the third shaft and the seventh shaft; and
a third clutch disposed between the fifth shaft and the eighth shaft, and wherein the planetary gear train further includes:
a first brake disposed between the third shaft and the transmission housing;
a second brake disposed between the ninth shaft and the transmission housing; and
a third brake disposed between the eighth shaft and the transmission housing.

18. The planetary gear train of claim 16, wherein
the clutch includes:
a first clutch disposed between the first shaft and the seventh shaft;
a second clutch disposed between the third shaft and the seventh shaft; and
a third clutch disposed between the fifth shaft and the eighth shaft, and wherein the planetary gear train further includes:
a first brake disposed between the third shaft and the transmission housing;
a second brake disposed between the ninth shaft and the transmission housing; and
a third brake disposed between the fifth shaft and the transmission housing.

19. The planetary gear train of claim 15, wherein:
the first, second, and third rotational element respectively correspond to a first sun gear, a first planet carrier, and a first ring gear,
the fourth, fifth, sixth rotational elements respectively correspond to a second sun gear, a second planet carrier, and a second ring gear,
the seventh, eighth, and ninth rotational element respectively correspond to a third sun gear, a third planet carrier, and a third ring gear,
the tenth, eleventh, and twelfth rotational elements respectively correspond to a fourth sun gear, a fourth planet carrier, and a fourth ring gear, and
the thirteenth, fourteenth, and fifteenth rotational elements respectively correspond to a fifth sun gear, a fifth planet carrier, and a fifth ring gear.

20. The planetary gear train of claim 15, wherein
the first, second, third, fourth, and fifth planetary gear sets are disposed in sequence of the fourth, first, second, fifth, and third planetary gear sets.

* * * * *